July 14, 1953 J. A. RAJCHMAN ET AL 2,645,712

READING CIRCUIT FOR STORAGE TUBES

Filed Dec. 1, 1949 2 Sheets-Sheet 1

Inventors
Jan A. Rajchman,
Max H. Mesner &
Milton Rosenberg

By Morris A. Rabkin

Attorney

READING CIRCUIT FOR STORAGE TUBES

Filed Dec. 1, 1949 2 Sheets-Sheet 2

Inventor
Jan A. Rajchman,
Max H. Mesner &
Milton Rosenberg

By Morris A. Rabkin
Attorney

Patented July 14, 1953 2,645,712

UNITED STATES PATENT OFFICE 2,645,712

READING CIRCUIT FOR STORAGE TUBES

Jan A. Rajchman and Max H. Mesner, Princeton, and Milton Rosenberg, Trenton, N. J., assignors to Radio Corporation of America, a corporation of Delaware Application December 1, 1949, Serial No. 130,411

5 Claims. (Cl. 250—27)

Figure 1:
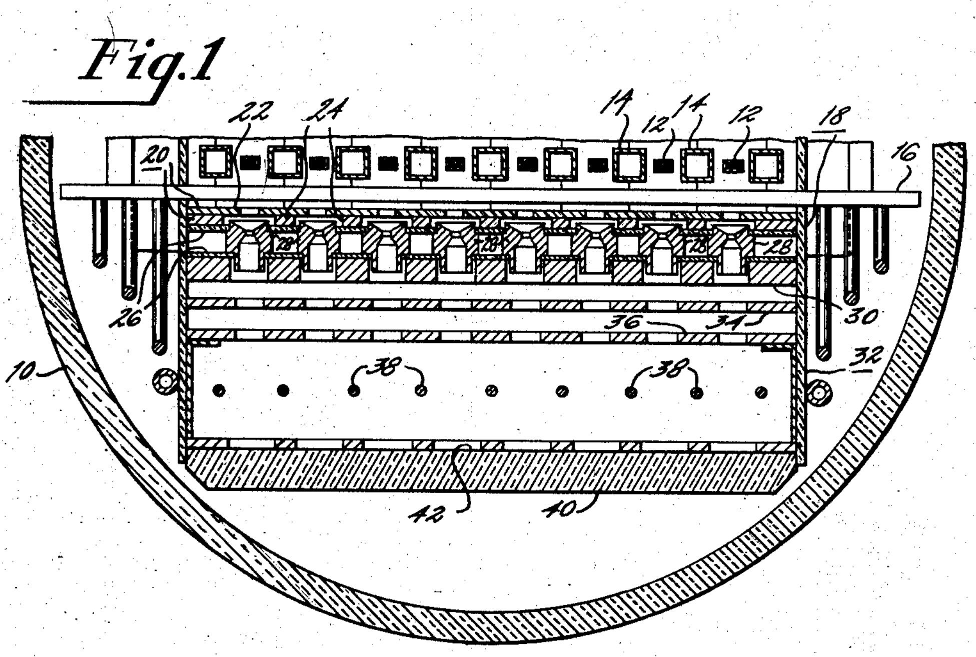

The present invention relates to apparatus for deriving information from electron discharge tubes of the grid action storage target area selecting type.

Electron tubes of the storage target area selecting type have been described and claimed by Jan A. Rajchman in a pending application, Serial No. 118,758, filed September 30, 1949, and in another pending application, Serial No. 665,031, filed April 26, 1946, now Patent No. 2,494,670, issued January 17, 1950, both for an "Electron Discharge Device." These tubes permit the selection, for storage or reading of a discrete area of their target. The later filed application describes and claims an improved form of the storage tube. This form of the tube may consist of a central planar source of electrons, a selecting grid mesh which "sandwiches" the electron source, a pair of grid action storage targets enclosing the grid mesh and a pair of reading targets enclosing the storage targets. Grid action storage targets and reading targets are fully described and claimed in pending applications, Serial No. 722,194, filed January 15, 1947, now Patent No. 2,513,743, issued July 4, 1950 and Serial No. 122,657, filed October 15, 1949, now Patent No. 2,604,606, issued July 22, 1952, both by Jan A. Rajchman.

The target described in detail in the later filed application is the one used in the latest form of the storage tube. It consists of a grid action storage type target including a plurality of storage eyelets, and a reading target having a reading plate, a Faraday shield box which encloses a plurality of parallel reading wires, and a translucent plate having one side coated with a fluorescent and secondary electron emissive material. Information is stored in each of the storage eyelets as a potential, either that of the cathode or the collector.

In the grid action target area selection type of tube as briefly described above an indication of the information stored in each target area may be obtained either visually or electrically. The obtention of this information is known as "reading" the target. The grid action target allows electrons from the cathode to pass through each storage area to the reading target only when the storage area is at anode potential. These electrons are allowed to bombard the secondary emissive fluorescent material which is coated on the translucent plate of the reading target. The emitted secondary electrons are collected by the reading wires in the Faraday shield enclosure. By closing all windows but one, the information contained in the storage area opposite the one open window may be determined by whether or not an electric current flows in the reading wire. However, this current flow is very weak and although every effort is made to shield the reading wires, there is still some capacitive pickup or false signal produced in the reading wires, which can produce a false reading or indication of the information in the storage area which is being read.

Accordingly, it is an object of the present invention to provide apparatus for deriving information from a target area selection tube which is not responsive to false signals.

It is a further object of the present invention to provide apparatus which gives a true indication of the information stored in a memory element.

These and other objects are achieved in the present invention by coupling, to the reading wires of a target area selection type of tube, a circuit whereby any signal in the reading wires is amplified and applied to one grid of a normally closed gate tube. The gate tube is opened by a pulse which is timed to occur between any capacitive pickup, which can occur at the reading wires. The gate tube output is coupled to a multivibrator of the type having two conditions of stability. The multivibrator is always preset to the same one of the two conditions of stability prior to the reading of a selected memory element. Therefore, if the memory element is at collector potential, when it is read it permits electrons to pass through it to the reading target and the consequent reading wire signal caused thereby is applied by the gate tube, when it is opened, to the multivibrator to trip it to its other condition of stability. If the memory element is at cathode potential, when it is read, it prevents electrons from passing through it to the reading target consequently when the gate tube is opened the multivibrator remains in its same condition of stability and is thereby truly indicative of the information stored in the memory element being read.

Figure 3:
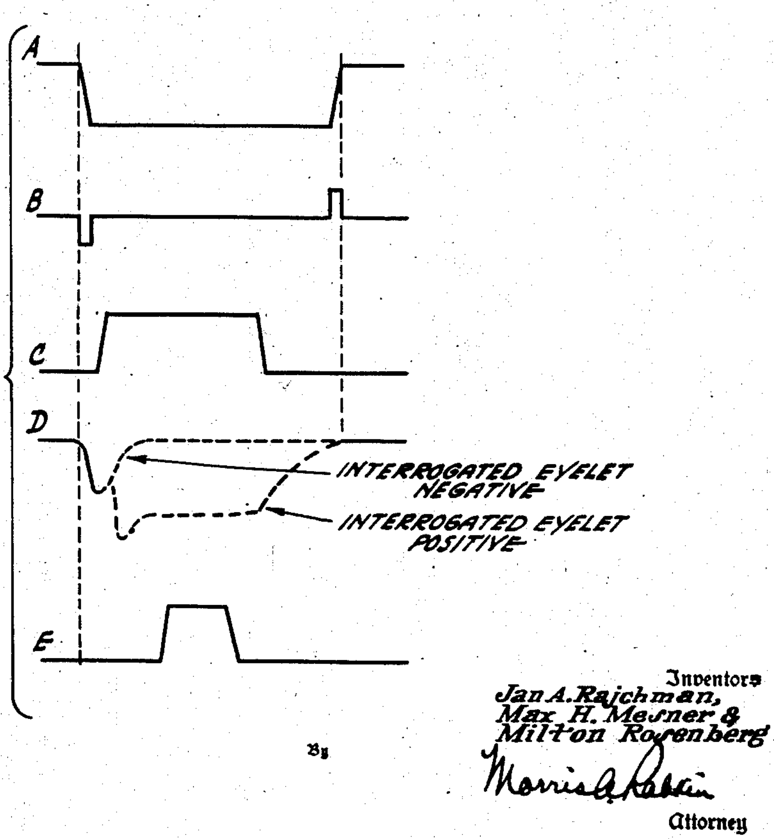
Figure 2:
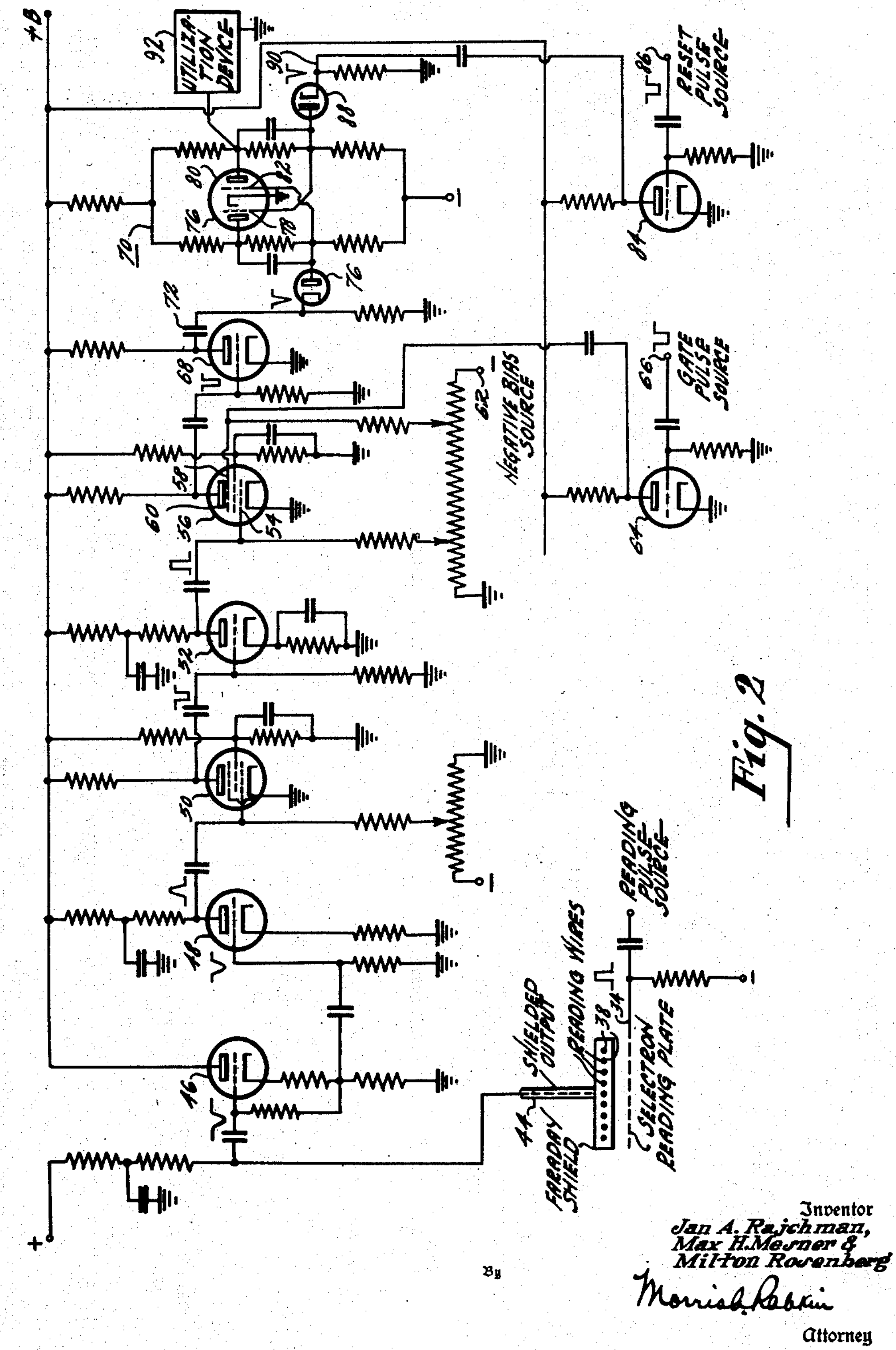

The novel features of the invention as well as the invention itself, both as to its organization and method of operation will best be understood from the following description, when read in connection with the accompanying drawings in which, Figure 1 is a sectional view of a target area selecting tube, an understanding of which is required for an understanding of the invention, and Figure 2 is a schematic diagram of an embodiment of our invention, and Figure 3 is a representation of the voltage pulse waveshapes used with the embodiment of our invention.

The target area selecting tube, a sectional view of which is shown in Figure 1, is fully described and claimed in application, Serial No. 118,758, filed September 30, 1949, for an Electron Discharge Tube, by Jan A. Rajchman.

Referring to Figure 1, a target area selecting tube includes a glass envelope 10 centrally disposed within which are a plurality of elongated cathodes 12 of rectangular cross section which are coextensive with a set of separately insulated, vertical, selecting wires 14 or bars of square cross section. The cathodes are interposed between and are alternate with the vertical selecting bars. The remaining structure of the tube, for convenience, is shown and described herein on only one side of the plane formed by the cathodes and vertical selecting bars. However, the tube structure is actually symmetrically constructed and the structure shown herein on one side of the cathode and vertical selecting bar plane is actually disposed on both sides and sandwiches the cathodes and vertical selecting bars.

A plurality of spaced, parallel separately insulated horizontal selecting wires 16 or bars are spaced from and parallel with the plane formed by the cathodes and vertical selecting bars. It will be readily appreciated that the horizontal and vertical selecting wires define a plurality of rectangular openings or windows. Electrons from the cathodes must pass through these windows to the target. However, the bias, which is applied to any one of the selecting bars defining a window, determines whether or not electrons are permitted to pass through that window. These horizontal and vertical selecting wires form a grid mesh.

Spaced from and parallel to the plane of the grid mesh is a first target 18. This consists of a collector electrode having a plurality of perforations aligned with the windows. The collector electrode consists of two adjacent metal plates, a collector mask 22, which has the smaller perforations, and a collector spacer 24 which has the larger perforations. Two perforated plates 26 made of an insulating material, such as mica, insulatingly support between them a plurality of storage eyelets 28. These storage eyelets 28 are made from a metal having good secondary emission and not evaporating too easily.

The perforations of the insulating plates are placed so that the eyelets are retained in alignment with the collector electrode perforations and the windows formed by the selecting bars. The perforations in the collector spacer 24 are of such size as to permit it to be brought against the insulating plate which holds the storage eyelets 28 without touching them.

A bias or writing plate 30 is the last part of the first target assembly. It is made of metal and also has perforations large enough so that it can fit over and proximal to the tails of the storage eyelets and against the insulating sheet between the storage eyelets. The writing plate thickness is such as to cause it to have a reansonably large capacity with the eyelets.

The second target 32 structure consists of another metal plate, spaced from and parallel to the writing plate. This is known as the reading plate 34 and also has perforations which are aligned with the storage eyelets 28. Spaced from the reading plate 34 is a Faraday screen or cage 36. It is made in the form of a rectangular metal box having two sides parallel and substantially coextensive with the reading plate 34. These two parallel sides have perforations which are aligned with the reading plate perforations and the storage eyelets. Extending through the Faraday cage and positioned between the rows of perforations are a number of reading wires 38. These wires are connected together and a single shielded lead is brought therefrom external to the tube. A translucent plate 40 having on one side a fluorescent secondary emissive coating 42, such as willemite, is placed with its coated side against the outside of the perforated wall of the Faraday cage which is further away from the reading plate 34. The structure of the first and second targets is more fully described and claimed in a pending application for "Target for Storage Tubes," Serial No. 122,657, filed by Jan A. Rajchman on October 15, 1949, now Patent No. 2,604,606, issued July 22, 1952.

Information is stored in each of the storage eyelets as a potential, that is, each eyelet may be independently made to assume either the potential of the cathode 12 or of the collector 20. The storage of information is performed one eyelet at a time by cutting off the flow of electrons to all but the selected eyelet by closing all the windows to the passage of electrons but the one opposite the eyelet selected. Systems for interconnecting and biasing the selecting wires to achieve selective control of the windows formed by the selecting wires are described and claimed in a pending application, Serial No. 702,775, filed October 11, 1946, now Patent No. 2,558,460, issued June 26, 1951, by Jan A. Rajchman for "Scanning Circuits for Area Selection Tubes and the Like" and in a pending application assigned to this assignee by G. W. Brown, Serial No. 694,041, filed August 30, 1946, now Patent No. 2,519,172, issued August 15, 1950, for "Control of an Electron Discharge Device of Area Selection Type."

In the process of reading the information stored in each eyelet, one window is left open opposite the eyelet desired to be read so that electrons from the cathode may reach it. The remaining windows are closed. In the embodiment of the target area selecting tube shown, this is accomplished by applying a negative selecting pulse to one or more of the selecting wires defining each window except to the selecting wires defining the window desired to be left open. The first target 18 has a grid action in that, if a storage eyelet is at cathode potential no electrons can pass through it and if the storage eyelet is at collector potential electrons can pass through it.

The reading plate 34 is normally biased negative to repel any electrons that may pass through the storage target. When it is desired to read a selected eyelet, a positive pulse is impressed on the reading plate 34 which permits electrons, which pass through a storage eyelet 28 at collector potential, to pass through the reading plate, through the Faraday shield 36 to strike the fluorescent secondary emissive coating 42. The emitted secondary electrons are then captured by the reading wires 38 causing a current to flow therein.

The reading plate also serves to assist in the detection of the current from a single window. In the operation of the storage tube, all the windows are opened for the standby or quiescent period causing the fluorescence of areas of the target opposite the eyelets at a positive potential and a large current flow in the reading wires.

This is due to a plurality of storage eyelets usually being at collector potential. If it is then desired to read a single eyelet, all the windows must be closed except the interrogated one. In the absence of a reading plate, time would have to be wasted until the reading wire current subsides from the value due to a plurality of the positive eyelets to the value due to one eyelet (about 40 microamperes). The detecting system also would be required to distinguish the difference between the current from a plurality of storage eyelets and the current from one eyelet. This is a difficult assignment in view of the small current from one eyelet. With the use of a reading plate however, when it is biased negative, all current from the storage target is cut off. Therefore no time need be allowed for the reading wire current to subside. In place of having to detect the current from one eyelet after the current from a plurality of eyelets, the problem is reduced to either detecting the current from a positive eyelet or one at cathode potential, or alternatively stated, only the presence or absence of current from one storage eyelet must be detected.

Referring to Figure 2, the reading wires are all connected together and connected external to the tube by means of a shielded lead 44. This lead is connected to a cathode follower stage 46. To reduce any unnecessary capacity in the shielded lead 44, the cathode follower stage 46 is located as close as possible to the tube. The cathode follower output, being at low impedance may be connected to the following stages by a long lead. The cathode follower stage 46 is followed by three cascaded amplifier stages 48, 50, 52.

The output of the last amplification stage 52 is coupled to the control grid 54 of a multigrid gate tube 56. By means of a negative bias which is applied to its control grid 54 and suppressor grid 58 from a negative bias source 62, the gate tube 56 is normally maintained nonconducting. The suppressor grid 58 is also coupled to the output from a gate pulse amplifier 64. This stage amplifies voltage pulses received from a gate pulse source 66.

The anode 60 of the gate tube 56 is coupled to a stage of amplification 68 which serves to amplify any voltage output from the gate tube sufficiently to drive a multivibrator 70 to which the output of the amplification stage 68 is coupled. The stage of amplification 68, also known as a multivibrator driver, is coupled to the input of the multivibrator 70 through a differentiating circuit 72 comprising a series condenser and shunt resistor and a rectifier 76 which is connected between the differentiating circuit and the multivibrator 70 to pass only negative pulses to the multivibrator.

The multivibrator 70 is the symmetrical type, having cross connected grids and plates, well known to the art, and having two conditions of stability which are represented by conduction in either the right triode or the left triode. The one of the two triodes that is conducting will remain conducting until the application of a pulse of the proper polarity to either of the two control grids causes a transfer of conduction to the other of the two tubes. The theory of operation of the multivibrator is commonly known and may be found explained on pages 362–364 of a book by Herbert J. Reich, called Theory and Applications of Electron Tubes (published by McGraw Hill Co.).

The grid 82 of the right triode 80 is coupled to the output from the driver stage 68, the grid 78 of the left triode 77 is coupled to the output from a reset pulse amplifier 84 through a rectifier 88 which is connected to permit only negative pulses to pass through to the grid and a differentiating circuit 90. The reset pulse amplifier is driven by pulses from a reset pulse source 86. One of the multivibrator anodes is connected to a utilization circuit 92.

Referring to Figure 3, when it is desired to interrogate or read the condition of a storage eyelet, a negative selection pulse A is applied to all the selecting bars except the two horizontal and two vertical selecting bars which define the window opposite the storage eyelet it is desired to interrogate. A bias matrix for the selective generation of such selecting pulses is described and claimed in a copending application for a "Bias Generating Matrix," Serial No. 130,412, filed December 1, 1949. A portion of the applied selecting pulse A may be applied to the reset pulse amplifier 84 which amplifies the pulse. The pulse is then differentiated and applied to the multivibrator 70 to reset it to its first condition of stability. Since the reset pulse B is a negative pulse applied to the grid 78 of the left triode 77, the first condition of stability is the one in which there is conduction in the right triode 80.

A short safety period after the selection pulse A has been applied, a positive reading pulse C is supplied from a reading pulse source 92 to the reading plate 34 to permit electrons from an interrogated eyelet 28, assuming the eyelet at collector potential, to pass through the reading plate. If the selected eyelet is at collector potential, a pulse of electron current is caused to flow in the reading wires 38. If the selected eyelet is at cathode potential, no electron current flows in the reading wires. However, because of a slight capacitive pickup from the selecting wires 14, 16 there is an initial pulse of electron current (see curve D in Figure 3), regardless of the eyelet potential. This current subsides after a short period of time if the interrogated eyelet is at cathode potential. If the interrogated eyelet is at collector potential the initial current pulse decreases slightly after a short time, then increases to a greater maximum finally leveling off until terminated by the termination of the reading pulse C. All this action is shown as curve D.

A gating pulse E from the gating pulse source 66 is applied to the gate pulse amplifier 64. The gating pulse E is timed to occur a short time after any capacitive pulse current in the reading wires has subsided. Therefore, when the gate 56 is opened, any signal which it passes it truly representative of the condition of the interrogated storage eyelet and is not affected by any capacitive pickup. Therefore, if the interrogated eyelet is at collector potential a current flows in the reading wires and a pulse is applied to the multivibrator to cause it to assume its second condition of stability wherein only the left triode is conductive. If the interrogated eyelet is at cathode potential, the multivibrator condition of stability is not changed and it remains in its preset condition. Therefore, whether or not the multivibrator is tripped is a definite indication or interpertation to the utilization device 92 of the condition of the interrogated eyelet.

The gating pulse E is terminated after a desired reading time. Next the reading pulse C is terminated which causes the electron current in the reading wires to subside. Finally, the selecting pulse A is terminated which terminates the reading period. The positive portion of the differentiated selecting pulse may be used to signal the end of the reading period to other apparatus or to start another cycle of operation.

From the foregoing description, it will be readily apparent that a system has been provided for properly interpreting a signal produced as a result of the information stored in the storage area of a storage target area selecting tube. Although only a single embodiment of the present invention has been shown and described, it should be apparent that changes may be made in the particular embodiment herein disclosed, and that many other embodiments are possible, all within the spirit and scope of the invention. It is therefore desired that the foregoing description shall be taken as illustrative and not as limiting.

What is claimed is:

1. The combination with a target area selecting tube wherein information is stored in each target area and wherein there are included means to derive a signal dependent upon the information stored in a selected target area, said signal being characterized by having spurious values, of means to interpret said signal to determine its true value comprising circuit means having a first and a second condition of stability, means to place said circuit means in said first condition of stability, normally closed electron switch means, said electron switch means having its input coupled to said means to derive a signal and its output coupled to said circuit means, and a gate pulse circuit including delay means operable to open said electron switch only after the time in which said spurious values may exist to permit application of a derived signal to said circuit means to alter the condition of said circuit means in accordance with said signal.

2. The combination with a target area selecting tube wherein information is stored in each target area and wherein there are included means to derive a signal from a selected target area dependent upon the information stored therein, said signal being characterized by having spurious values, of means to interpret said signal to determine its true value comprising a multivibrator having a first and a second condition of stability, means to place said multivibrator in said first condition of stability, a normally blocked gate tube having its input coupled to said means to derive a signal and its output coupled to said multivibrator, and a gate pulse circuit including delay means to unblock said gate tube only after the time in which said spurious values may exist to permit the application of a derived signal to said multivibrator to alter its condition of stability in accordance with said signal.

3. The combination with an electron discharge tube of the target area selecting type having a grid action storage target and a reading target including reading wires, wherein, after selection of a target area for reading, information stored in said selected area is detected by said reading wires as the presence or absence of a current, of means to interpret said reading wire current and to eliminate tube stray capacity coupling effects thereby enabling the true value of said reading wire current to be interpreted comprising a multivibrator of the type having a first and a second condition of stability, means to reset said multivibrator to its first condition of stability, a normally blocked gate tube, amplifier means coupling said reading wires to said gate tube input, said gate tube input being coupled to said multivibrator input, and a gate pulse source including means to unblock said gate tube at a time after selection of a target area for reading to eliminate stray capacitance effects and to effect a change in said multivibrator condition depending upon the presence or absence of a current in said reading wires.

4. The combination with a memory electron discharge tube of the type having a grid action storage target with a plurality of storage areas in each of which information may be stored as one of two potentials, and having a reading target including shielded reading wires wherein, upon selection of a storage area for reading, said storage area may or may not permit passage of electrons to cause currents to flow in said reading wires, depending upon the potential stored in said storage area, of means to derive information from said reading wires comprising a multivibrator having a first and a second condition of stability, means to reset said multivibrator to a first condition of stability, a gate tube having at least cathode anode and control grid electrodes, bias means to normally block said gate tube, amplifier means coupling said reading wires to said gate tube grid, driving amplifier means coupling said gate tube anode to said multivibrator input and a gate pulse source including means to unblock said gate tube at a time after the selection of a storage area for reading to eliminate stray capacitive effects to allow a true reading and to effect a change in said multivibrator condition depending upon the presence or absence of a current in said reading wires.

5. The combination recited in claim 4 wherein said means to reset said multivibrator is actuated upon selection of a target storage area for reading.

JAN A. RAJCHMAN.
MAX H. MESNER.
MILTON ROSENBERG.

References Cited in the file of this patent

UNITED STATES PATENTS

| Number | Name | Date |
|---|---|---|
| 2,236,134 | Gloess | Mar. 25, 1941 |
| 2,261,762 | Hazeltine | Nov. 4, 1941 |
| 2,266,401 | Reeves | Dec. 16, 1941 |
| 2,435,840 | Morton | Feb. 10, 1948 |
| 2,435,841 | Morton | Feb. 10, 1948 |
| 2,443,198 | Sallach | June 15, 1948 |
| 2,446,945 | Morton | Aug. 10, 1948 |
| 2,451,044 | Pierce | Oct. 12, 1948 |
| 2,485,821 | Gloess | Oct. 25, 1949 |
| 2,492,344 | Adams | Dec. 27, 1949 |
| 2,512,676 | Ransom | June 27, 1950 |